Aug. 7, 1956   F. W. SAMPSON   2,757,519
ICE MAKING APPARATUS
Filed Feb. 1, 1954   7 Sheets-Sheet 5
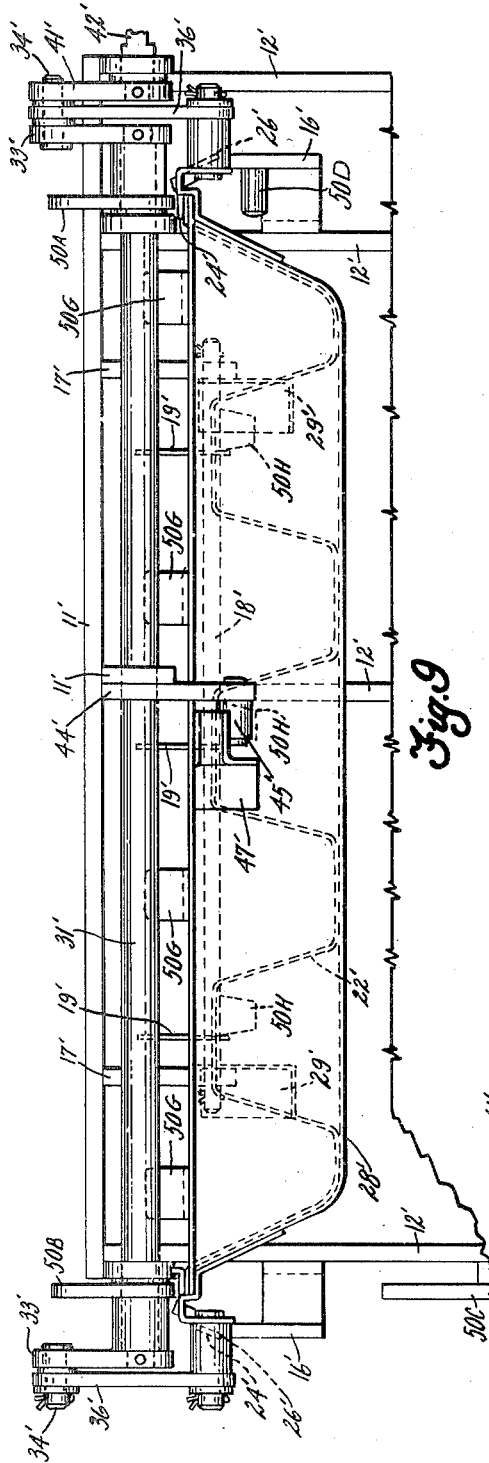
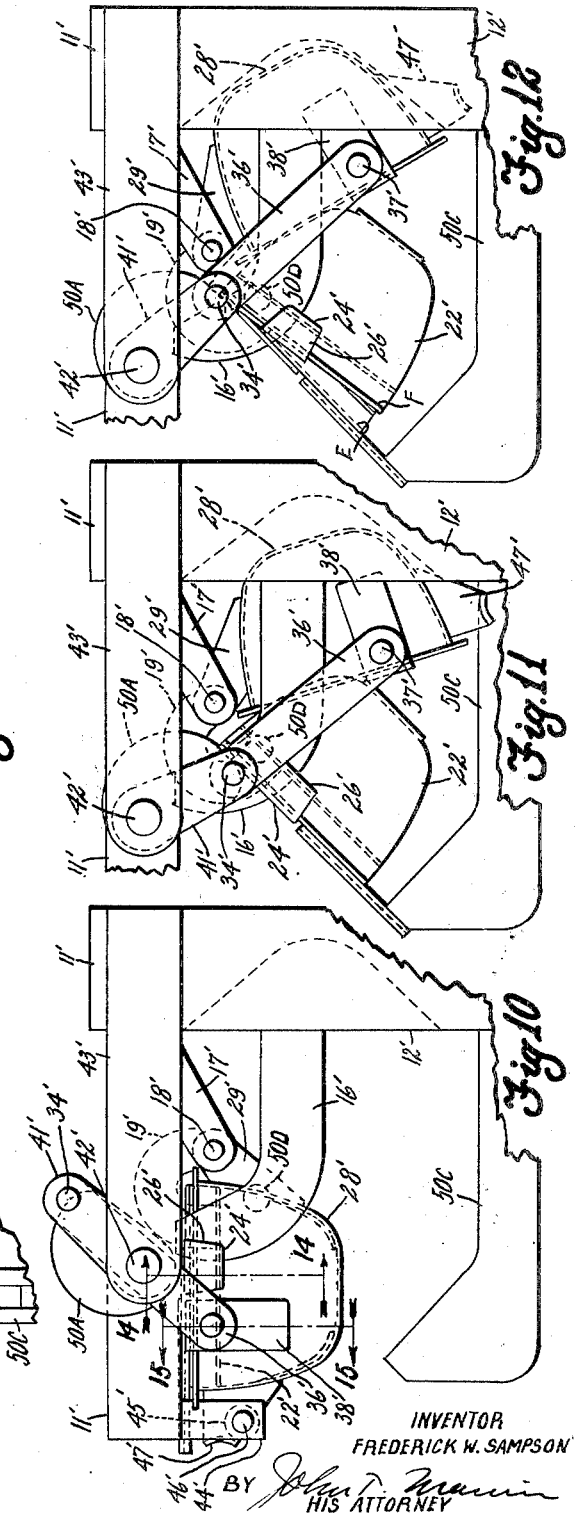
INVENTOR
FREDERICK W. SAMPSON
BY
HIS ATTORNEY

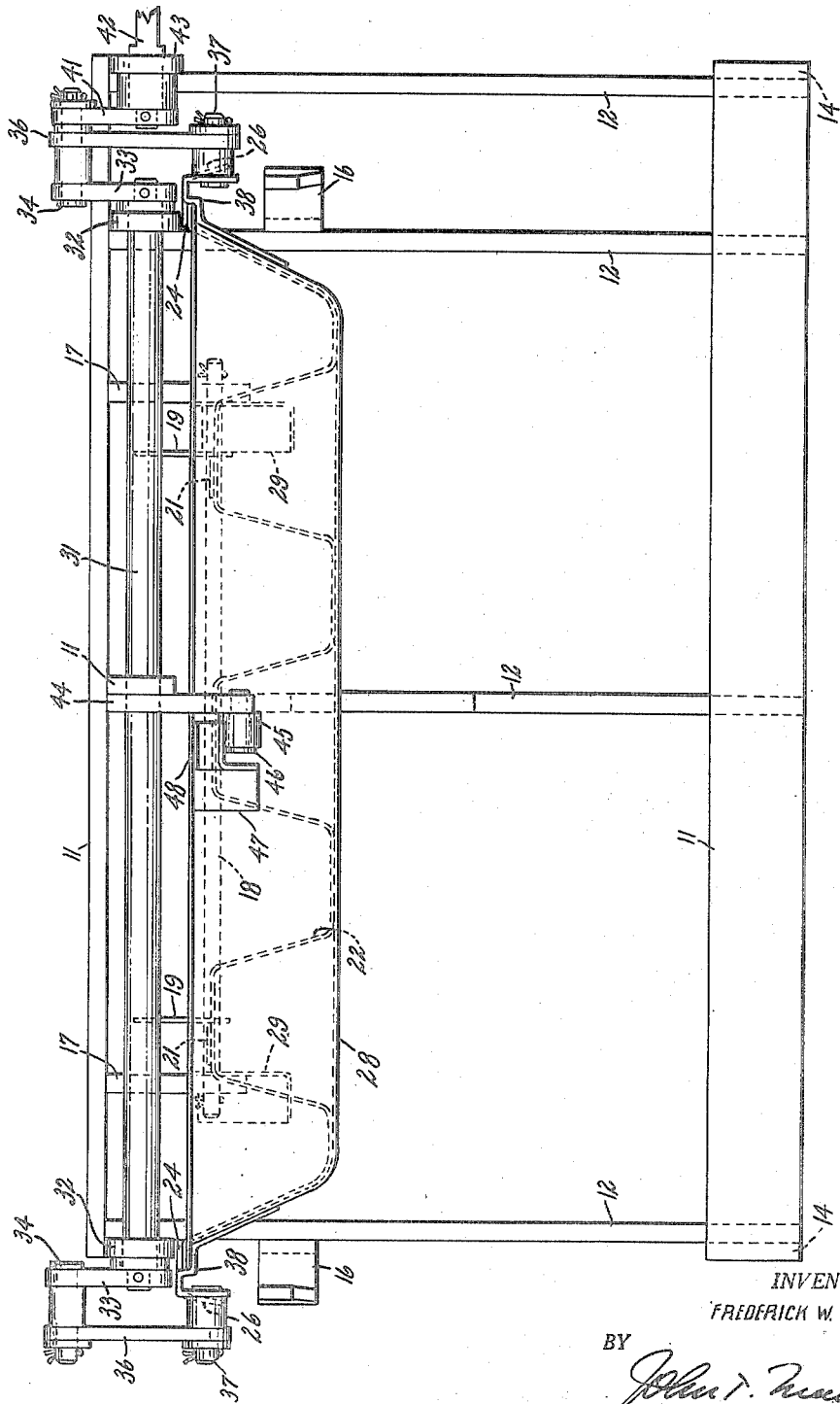

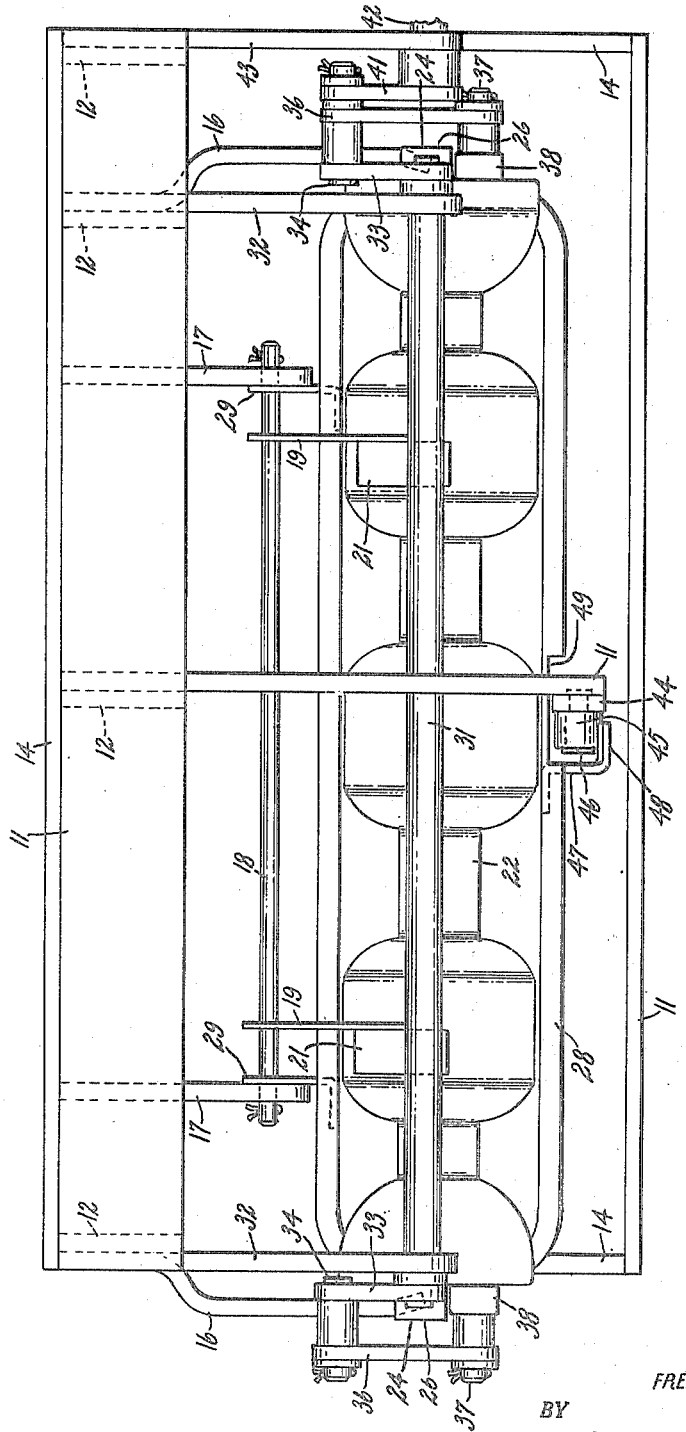

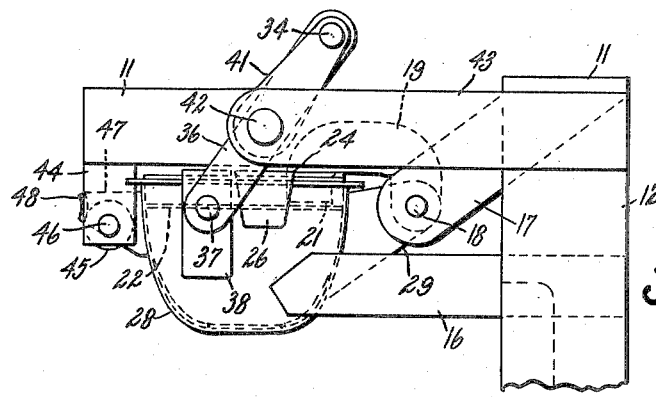
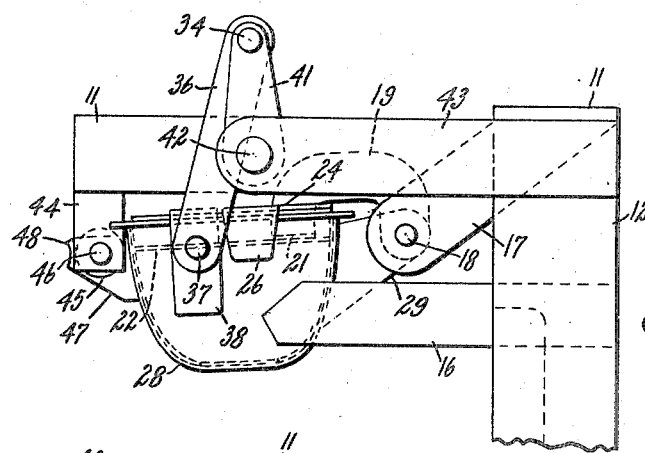
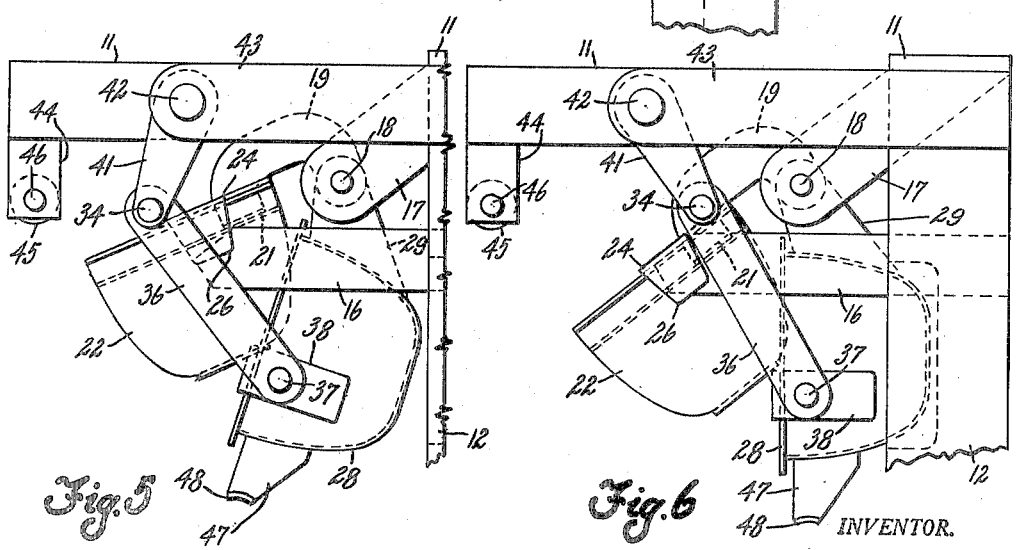

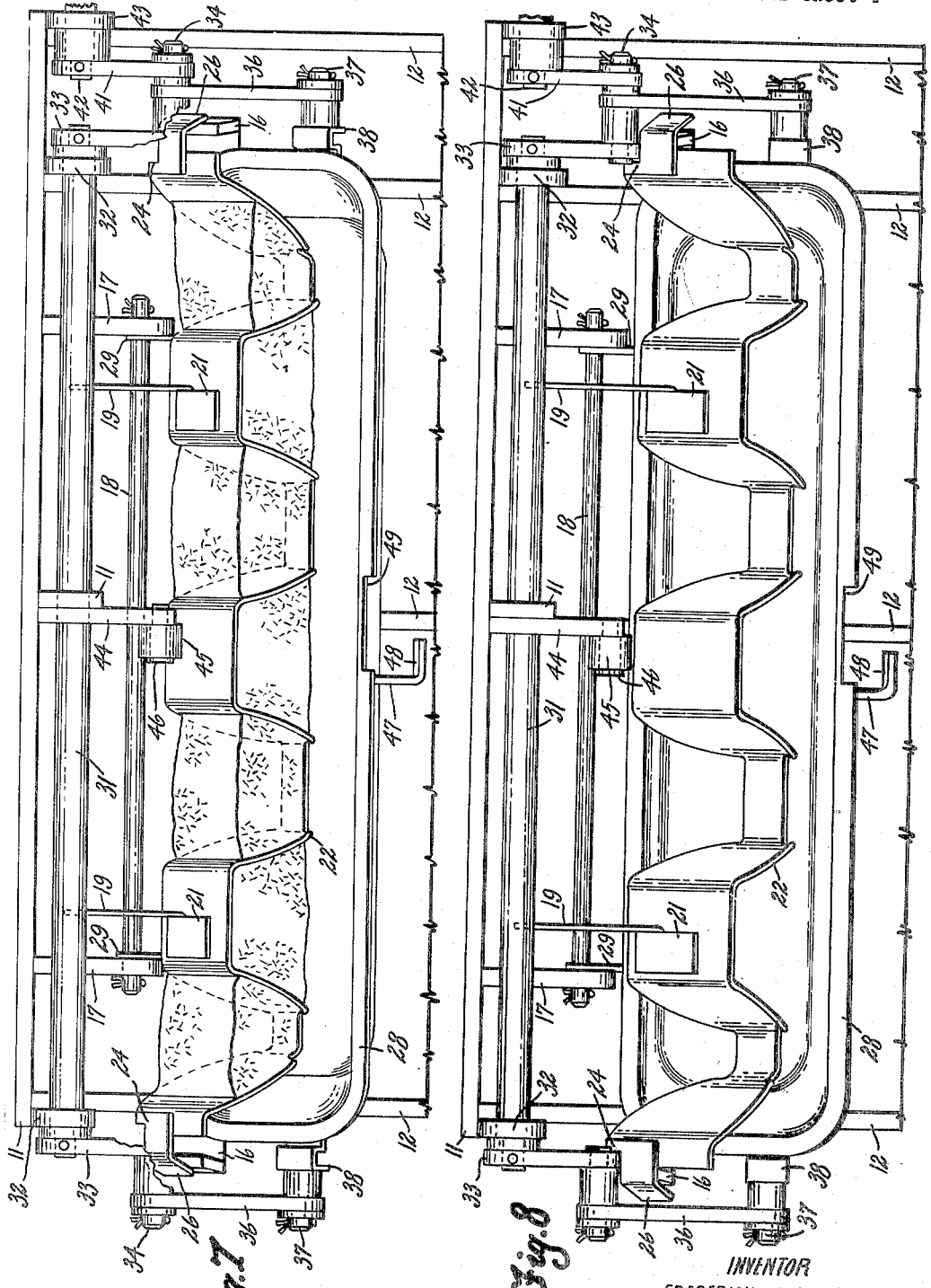

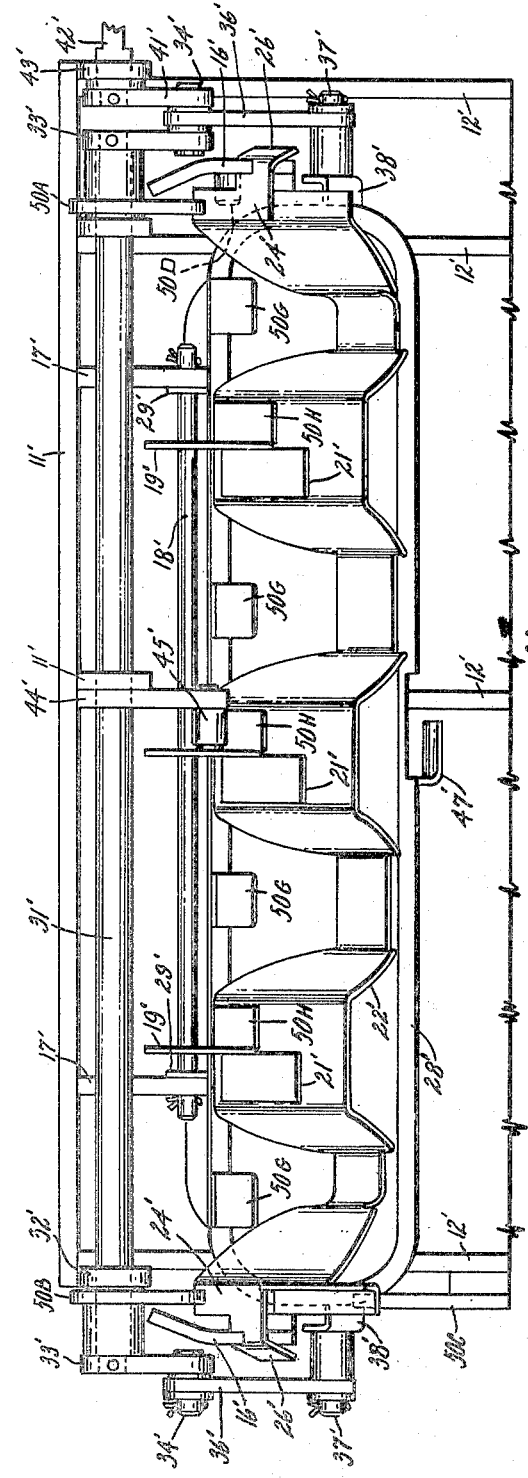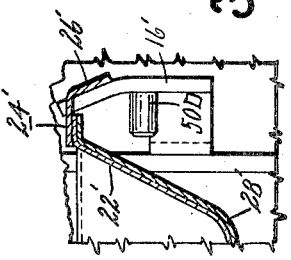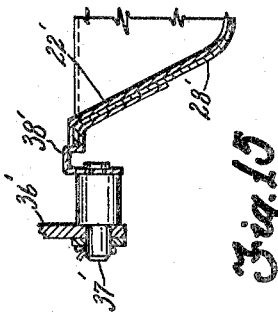

United States Patent Office 2,757,519
Patented Aug. 7, 1956

2,757,519

ICE MAKING APPARATUS

Frederick W. Sampson, Dayton, Ohio, assignor to General Motors Corporation, Detroit, Mich., a corporation of Delaware Application February 1, 1954, Serial No. 407,201

9 Claims. (Cl. 62—106)

This invention relates to refrigeration and particularly to ice block producing apparatus.

Others have heretofore provided apparatuses for freezing water into ice blocks or cubelets which are then harvested from the apparatus. Many of these prior apparatuses have not been entirely satisfactory. One of the main objections to certain of the prior apparatuses of this type is that heat is applied to a portion thereof for releasing ice blocks therefrom so that they may be harvested. The application of heat to such an apparatus complicates its construction, increases its manufacturing costs and in addition to rendering the refrigerating system associated therewith less efficient, since this heat must be removed by the refrigerating system before a subsequent freezing cycle takes place, also warms the ice blocks. The warming of ice blocks causes surfaces thereof to become wetted whereupon the released blocks will stick or bound together when they are collected in a receptacle or bin from which they are to be harvested. This bonding together of ice blocks or cubes renders the task of harvesting ice blocks from an ice maker difficult since the clumps of bonded together blocks or cubelets must be shattered in order to obtain a plurality of separate individual blocks to be placed in glasses containing drinks to be chilled. In view of the foregoing it is contemplated to construct an ice block making apparatus which will overcome objections to former devices.

An object of this invention is to provide an improved ice cube or block making apparatus of simplified construction and low manufacturing costs.

Another object of this invention is to provide an ice cube or block maker wherein the cubes or blocks are released therefrom mechanically as distinguished from applying heat to parts thereof whereby subsequent freezing cycles may be initiated without delay.

Another object of this invention is to provide an ice making apparatus or device of this type which produces small ice blocks or cubelets to be placed in glasses containing drinks to be chilled wherein the ice blocks or cubelets are released from the same in dry form by either a stretching or twisting and/or a combined stretching and twisting action of a resilient metal walled grid member of a two-membered ice block freezing device.

A further object of this invention is to provide an ice block making apparatus with a freezing device including a support and a tray member cooperating with a flexible metal walled grid member wherein at least the tray member is pivotally mounted upon the support and is swingable by an operating means downwardly away from the grid member and which operating means renders other means incorporated in the apparatus effective to flex resilient metal walls of the grid member in a plurality of directions and releases ice blocks therefrom.

In carrying out the foregoing objects it is a still further object of the present invention to provide a device for freezing water into cubes or blocks and mechanically releasing them therefrom which devices may be readily placed in a low temperature freezing compartment of refrigerator cabinets now in use or may be permanently installed in new refrigerators and to provide suitable means whereby ice block freezing operations of the devices can be selectively controlled to cause intermittent and or continuous ice block producing cycles depending upon a contemplated demand for ice blocks.

Further objects and advantages of the present invention will be apparent from the following description, reference being had to the accompanying drawings wherein preferred forms of the invention are clearly shown.

In the drawings:

Figure 1 is a front view of a portable freezing device portion of an ice making apparatus;

Figure 2 is a top view of the freezing device shown in Figure 1;

Figure 3 is an end view of the device disclosed in Figure 1 showing a tray member and a grid member thereof in a normal freezing position;

Figure 4 is an end view of the device shown in Figure 1 with the tray thereof slightly moved relative to its support to distort its walls and release the same from ice formed in the grid;

Figure 5 is an end view of the device shown in Figure 1 with the tray moved away from the grid and with ends of the grid about to engage a means on the support of the device for stretching the grid and flexing its walls;

Figure 6 is an end view similar to Figures 3, 4 and 5 showing the tray and grid of the freezing device swung throughout a predetermined arc about their pivotal mounting on the support of the device;

Figure 7 is a front view of the device in the position thereof shown in Figure 5 about to engage means on its support to stretch the grid;

Figure 8 is a front view of the device similar to Figure 7 in the position thereof shown in Figure 6 with the grid fully stretched;

Figure 9 is a front view of a slightly modified freezing device portion of an ice making apparatus;

Figure 10 is an end view of the device disclosed in Figure 9 showing the tray and grid member thereof in a normal freezing position;

Figure 11 is an end view of the device disclosed in Figure 9 showing the tray and grid thereof moved about their pivotal support;

Figure 12 is a view similar to Figures 10 and 11 showing the tray and grid of the freezing device disclosed in Figure 9 swung their full distance relative to the support and showing the grid twisted;

Figure 13 is a front view similar to Figure 9 showing the grid stretched and twisted with ice blocks released therefrom as is illustrated in Figure 12;

Figure 14 is a sectional view taken on the line 14—14 of Figure 10 showing an ear on the end of the grid member of the freezing device;

Figure 15 is a sectional view taken on the line 15—15 of Figure 10 showing a mounting tab on the end of the tray of the device.

Figure 16:
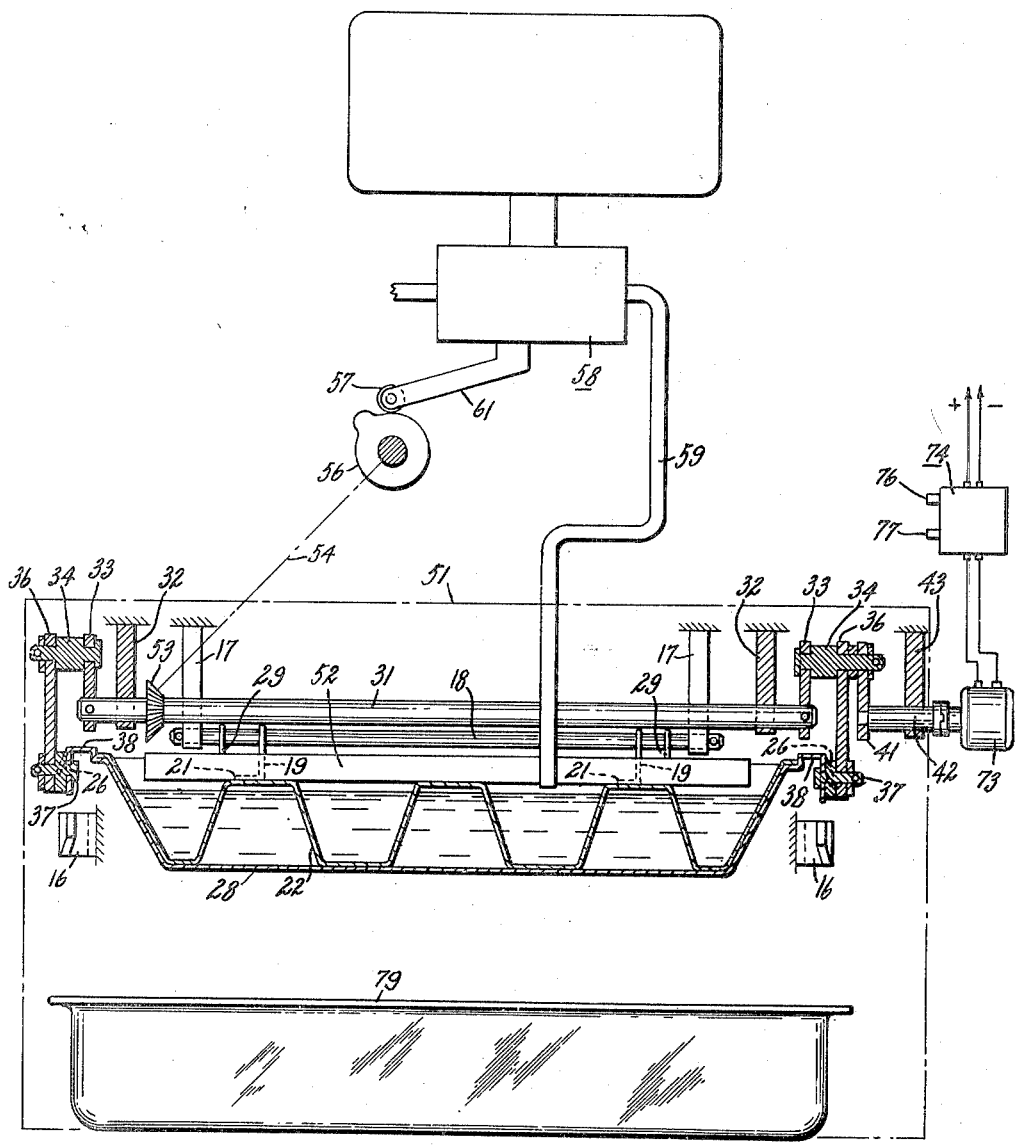
Figure 16 is a schematic showing of one of the ice making apparatuses herein disclosed diagrammatically applied to or built in a refrigerator cabinet.

Referring to the drawings there is shown in Figure 1 thereof one form of freezing device of an ice block making apparatus having the present invention embodied therein. This device may be readily disposed in the freezing or frozen food storage compartment of refrigerator cabinets now in use and wherein the temperature is maintained well below 32° F. In this form of ice block making apparatus a support for the freezing device thereof comprises a plurality of horizontal metal beams 11, a plurality of upright metal beams 12 and suitable connecting or reinforcing beams 14 all welded or otherwise suitably secured together. These metal beams 11, 12 and 14 provide a framework having a base portion and an upright portion forming a support for pivotally mounting the freezing device of the apparatus thereon. A metal piece or hook 16 is rigidly secured to certain of the upright beams 12 at each end of the supporting framework and forms one part of a camming means to be hereinafter described. A pair of metal pieces 17, rigidly secured to the uppermost horizontal beam 11, carries a rod 18 upon which a pair of arms 19 are pivotally mounted and are slidable therealong. These arms 19 are secured, as at 21, to flat upper portions of a grid member 22 of the freezing device for pivotally mounting this grid member upon the supporting framework. Grid member 22 includes resilient flexible metal walls arranged in zigzag form along the length thereof for a purpose to be hereinafter described. Each end of grid 22 has a metal ear piece 24 rigidly secured thereto and provided with a downturned angularly disposed flange 26 (see Figures 7, 8 and 14) forming the other part of the aforesaid camming means adapted to engage the metal hook pieces 16. A resilient distortable metal walled tray member 28 of the freezing device has ears 29 welded or otherwise suitably secured to its one long side wall and these ears 29 are also carried by rod 18 for pivotal movement relative thereto. A shaft 31, journaled in spaced apart metal pieces 32 secured to the beams of the support or framework, has links 33 keyed or stationarily secured in any suitable or conventional manner thereto and extending outwardly thereof. The outer end of links 33 rotatably carries a stud 34 to which one end of another set of links 36 is pivotally connected. The opposite end of each link 36 carries a pin 37 which is connected to a bent metal piece 38 soldered or otherwise suitably secured to the ends of tray member 28 of the freezing device (see Figures 1 and 15). Tray member 28 is pivotally mounted upon the support or framework of the apparatus by the ears 29 and the links 36 for the purpose of swinging tray 28 about its pivotal mounting on the support relative to grid member 22. The links 36 also form a part of a holding means for normally retaining the freezing device in a substantially horizontal plane with the tray member 28 thereof cooperating with the grid member 22 in such a manner that the grid is disposed in the tray and its walls divide the interior thereof into a row or a plurality of ice block forming compartments. The holding means in the present disclosure includes another link 41, similar to and aligned with link 33, having its one end attached to one of the studs 34 at one end of the support or framework. This link 41 has its other end keyed or rigidly secured to a drive shaft 42 which is journaled in a suitable metal piece 43 welded to the support or framework of the apparatus. Drive shaft 42 is horizontally aligned with the long shaft 31 and is adapted to be rotated about the same axis therewith. Manually actuated means such as a crank or the like (not shown) can be attached to the short drive shaft 42 for operating the freezing device or an electric motor controlled in any suitable or conventional manner can be connected thereto. A heavy metal piece 44 welded or otherwise suitably secured to the uppermost horizontal beam 11 has a depending portion extending down in front of tray member 28 and a roller 45 is mounted on a stud 46 at the lower end of the depending portion of piece 44. A stamped piece of metal 47 suitably secured to the front side wall of tray 28 is provided with a curved or rounded projection 48 which is associated with roller 45 to form a cam or camming means for a purpose to be hereinafter described. Suitably bushings, spacers and pins are provided throughout the apparatus to complete its construction and it is believed to be unnecessary to explain such elements in detail herein.

Assuming that the freezing device, including the tray member 28 and grid member 22, is held in a substantially horizontal plane or in its normal ice freezing position as shown in Figures 1, 2 and 3 and that the device has received water, from any suitable source, to be frozen into ice blocks within the freezing or frozen food compartment of a refrigerator cabinet. The water upon freezing in the freezing device of this ice making apparatus becomes bonded to walls of both the grid member 22 and the tray member 28. In order to release and permit harvesting of ice blocks from the freezing device short shaft 42, of the freezing device holding means, is rotated either mechanically or by an electric motor under the control of a suitable or conventional timer. Rotation of drive shaft 42 rotates link 41, keyed thereto, and this link simultaneously rotates stud 34 and links 33 and 36 at the one end of the apparatus to rotate shaft 31. This rotation of shaft 31 also rotates the links 33 and 36 at the other end of the apparatus. The initial movement of rotation of the pair of links 36, of the holding means for the freezing device, from the position shown in Figures 1, 2 and 3 to the position thereof shown in Figure 4 forces the curved portion 48 of metal piece 47, on wall of tray 28, to ride over the roller 45 and thus cam the tray member to flex or distort its walls and break the ice bond between its walls and ice blocks adhering to walls of the grid member 22 (see Figure 4). Continued rotation of the links 36, under the influence of the operating means, swings the tray member of the freezing device about its pivotal mounting, rod 18, relative to the grid member 22 and this continued rotation also causes the end of the short links 33, connected to studs 34, to engage and apply a force to the end metal pieces 24 on grid member 22 to swing the grid 22, together with ice blocks adhering to its walls, downwardly relative to the supporting framework of the apparatus about its pivotal mounting upon rod 18 into the position shown in Figures 5 and 7 of the drawings. In this position of the apparatus the angularly disposed or inclined flange 26 of end pieces 24 on grid member 22 are about to engage the metal pieces 16 (see Figures 5 and 7). Further rotation of links 36, to swing the tray member 28 about its pivotal mounting throughout a predetermined arc, so as to locate the tray member in the position shown in Figures 6 and 8 of the drawings also causes the end of links 33 to force the angular or inclined surface of flange 26 of metal pieces 24, at the ends of grid member 22, over the metal pieces 16 on the support. The action resulting from flanges 26 engaging the other part of the camming means or pieces 16 and sliding over the surface thereof is an extension of the grid 22 longitudinally of its length and a stretching of its flexible metal walls. The pivotal mounting arms 19 of grid member 22 are arranged along rod 18 so that they can move lengthwise therealong and permit such stretching of the grid. Stretching of the grid member 22 momentarily distorts its resilient metal walls and such distortion flexes the walls and breaks the bond between ice blocks and these walls whereupon the ice blocks are mechanically released from the grid as distinguished from applying heat to the device. Tray member 28 having previously been swung from beneath grid member 22, in advance of the swinging of this grid member (see Figure 6), permits the released ice blocks to fall into a receptacle which may rest upon the bottom of the freezing compartment of the refrigerator cabinet and from which the ice blocks can be harvested.

The final rotation of drive shaft 42 of the apparatus is utilized to move elements thereof from the position shown in Figures 6 and 8 of the drawings to their normal position shown in Figures 1, 2, 3 and 16. This final rotation of shaft 42 moves the links 33 past the end pieces 24 on grid member 22 and causes the links 36 to pull upwardly on the tray member 28 which then reverses its swinging movement. The reverse swinging movement of tray 28 causes the same to engage the grid member and, with the grid member in the tray member, both are swung back into their normal substantially horizontal position as shown in Figures 1, 2, 3 and 16. Curved portion 48 of metal piece 47, on the front side of tray 28, rides upwardly over the roller 45 to render the tray wall ready to be sprung or distorted by a subsequent operation of the apparatus. In this respect it is to be noted that the rim of tray member 28 is cut away as at 49 (see Figures 2, 7 and 8) to permit the same to clear the roller 45 and support 44 while being moved past these elements. Upon stopping the drive shaft 42 of the apparatus in the position shown in Figures 1, 2, 3 and 16 this shaft together with its associated links 33, 36 and 41 form the holding means for normally maintaining the freezing device portion of the apparatus, including the grid member 22 and tray member 28, in its normal substantial horizontal position. The apparatus may now be immediately readied for another ice block freezing and releasing operation by again placing water in the freezing device portion thereof.

While the apparatus heretofore described embodies the feature of stretching the grid member to flex its resilient or flexible walls in releasing ice blocks therefrom it may be preferred to provide an apparatus which will twist a grid to flex its walls. In this type of apparatus twisting of the grid member can be accomplished without stretching the same or such twisting can be a part of flexing the grid incorporated in an apparatus in which it is also stretched. By both stretching a flexible resilient metal walled grid and twisting the same from end to end thereof a more effective release of ice blocks from its walls is obtained and thus the likelihood of ice blocks remaining bonded to walls of the grid member of a freezing device of the type disclosed is entirely eliminated. I therefore in Figures 9 to 15 inclusive of the drawings show a modified version of the invention incorporated in an apparatus wherein the resilient walls of a grid is both stretched and twisted. In the apparatus of Figures 9 to 15 two cams 50A and 50B, separate from the links 33', are suitably secured or keyed to the shaft 31' of the freezing device holding means and are employed to engage the metal pieces 24' at the ends of resilient metal walled grid member 22'. In this modified showing of the invention the metal pieces or cam means 16', to be engaged by the angular flange 26' on the grid end pieces 24', are so shaped that as the grid member 22' is moved or rotated about its pivotal mounting on the supporting frame they cam the end pieces 24' of the grid member outwardly away from one another to thus stretch the elongated grid member 22' longitudinally of its length and flex its resilient metal walls. A stop arm 50C rigidly secured to the supporting frame, at one side thereof, is disposed in the path of swinging movement of grid 22'. A stop stud 50D is rigidly secured to the camming piece or fork 16' at the side of the supporting frame opposite the side thereof to which arm 50C is located (see Figure 9). Stop stud 50D is positioned a further distance around the arc of swinging movement of grid member 22' from the outer end of stop arm 50C (see Figure 10), for a purpose to be presently described. Cam 50A is preferably so shaped or is of such configuration that it will swing the one end of grid member 22' down or about its pivotal mounting a greater distance over that which the other cam 50B will swing the zigzag flexible metal wall grid. In other words cam 50B is designed to swing the one end of grid 22' into engagement with stop arm 50C and hold it against this arm while the other cam 50A applies a further force to the opposite end of grid member 22' to push it against the stop stud 50D. The force applied to or the extra or additional movement imparted to this opposite end of grid 22', by cam 50A, while the one end of the grid is held against stop arm 50C, causes the resilient zigzag metal walls of grid member 22' to be twisted throughout its length during or shortly after it is stretched. A more or less degree of twisting of the grid member, in accordance with the shape of cams 50A and 50B and the location of stop arm 50C relative to stop stud 50D, may if desired be provided in this modified apparatus. Also, if desired, suitable metal tabs 50G may be secured to the exterior upper side wall surface of tray member 28' (see Figure 9) so as to strike, when the tray member is swung down relative to grid member 22', certain ice blocks adhering to walls of the grid. Metal tabs 50H (see Figure 9) may also be secured to certain upper flat wall portions of the flexible grid member 22' so as to obtain a better bond of ice blocks to the grid rather than to walls of the tray.

Assume that the freezing device, including the tray member 28' and grid 22' of the modified apparatus disclosed in Figures 9 to 15 inclusive, is held in a substantially horizontal plane as shown in Figures 9 and 10 with water placed therein frozen and it is now desired to harvest ice blocks therefrom. Short shaft 42', of the freezing device holding means, may be rotated manually by a crank or by an electric motor as will be described hereinafter. Rotation of shaft 42' rotates link 41' and this link rotates the studs 34' and links 33' at opposite ends of the apparatus by revolving shaft 31'. This rotation of the freezing device holding means also revolves the cams 50A and 50B keyed upon shaft 31'. As the long links 36' move through the axis of shaft 31', during initial movement of the holding means, they force the metal piece 47' on tray 28' past roller 45' and this camming action distorts walls of tray member 28' to break the bond between the tray and ice blocks bonded or adhering to walls of the grid member 22'. Continued movement of the holding means of the freezing device swings the tray member 28' about its pivotal mounting beneath grid member 22' and to one side thereof (see Figures 11 and 13). This continued movement also simultaneously rotates the cams 50A and 50B, on shaft 31', into engagement with the end pieces 24' on grid member 22' and forces the flanges 26' thereon downwardly over the inclined camming sides of the metal forks or pieces 16', secured to the support or framework of the apparatus (see Figures 11 and 13). The resilient grid walls are flexed and grid 22' is stretched or extended longitudinally of its length during rotation thereof about its pivotal mounting relative to the supporing framework (see Figure 13). In addition to the flexing and stretching of grid member 22' this modified version of the invention is provided with means for further flexing the grid walls by twisting them. In this modified apparatus further swinging of grid member 22', by cams 50A and 50B, is provided and this further movement causes the end of grid 22' at the cam end 50B of the apparatus to strike the stop arm 50C. While came 50B holds the one end of grid 22' in engagement with stop arm 50C, continued rotation of shaft 31' and consequently cam 50A thereon causes cam 50A to apply an additional force to the other end of grid member 22' opposite the cam 50B (see Figure 11) over that required to extend the grid. This additional force applied to the grid pushes the end of the grid 22', at the cam 50A end of the apparatus, down into abutment with the stop stud 50D to thereby cause a further flexing of the resilient metal walls of grid 22' which twists the grid from end to end thereof as shown in Figure 13 and as indicated at E and F in Figure 12 of the drawings. The twisting of grid 22' and flexing of its resilient metal walls in this additional direction breaks all ice bonds between its walls and ice blocks to thus release the ice blocks from the grid. The tabs 50G on tray members 28' cooperate with the twisting motion imparted to grid member 22' since they strike certain of the ice blocks bonded to the grid, as the tray swings from the position thereof shown in Figure 11 to its position shown in Figure 12 and insures removal of ice blocks from the grid. Continued rotation of the holding means for the freezing device by the operating means in the present apparatus causes cams 50A and 50B to ride over and past the end pieces 24' on grid 22' whereupon the cams become ineffective as the links 33', 36' and 41' travel upwardly toward their normal position of stop. This final travel of the links 33', 36' and 41' reverses the direction of swing of the tray member and lifts the same upwardly. The tray 28' thereupon engages grid 22' and both are swung or moved back to normal position to replace the freezing device in a substantially horizontal plane as shown in Figures 9 and 10 of the drawings. The means including shafts 31' and 42', links 33', 36' and 41' forming the holding means for the freezing device having been stopped in the position shown in Figures 9 and 10 of the drawings readies the apparatus for another ice block freezing and releasing operation.

Either the freezing device disclosed in Figures 1 to 8 of the drawings or the freezing device disclosed in Figures 9 to 15 thereof may be embodied in an automatic continuous operating ice making apparatus. Thus I show in Figure 16 of the drawings a diagrammatical representation of the freezing device disclosed in Figures 1 to 8 incorporated in an automatic and/or semi-auntomatic ice making apparatus. Referring now to Figure 16 of the drawings the ice making apparatus shown therein is provided with a suitable control which selectively determines operation of the apparatus to produce one or more single independent ice block forming and releasing cycles and/or continuous ice block forming and releasing cycles. In this illustration the apparatus is built into a portion of the freezing or frozen food storage compartment of a refrigerator cabinet and walls of such a compartment are designated by the reference character 51. The reference characters heretofore applied to parts of the apparatus shown in Figures 1 to 8 inclusive of the drawings will be employed to designate similar parts of the apparatus disclosed in Figure 16. In the form of apparatus shown in Figure 16 a refrigerant evaporator of a refrigerating system associated with the frozen food compartment of a refrigerator cabinet, such as refrigerant evaporating conduits surrounding and embracing walls 51 of the compartment, as is common in the art may include an extension in the form of a stationary sharp freezing metal plate portion represented at 52 and adapted to be directly contacted by upper flat portions of the flexible metal zigzag walls of the grid member 22. This plate portion 52 of the evaporator lies along the freezing device portion of the apparatus in front of the metal pieces 19, which pivotally mount the grid member 22 to the rod 18, and has suitable conduit connections (not shown) with the other portion of the evaporator of the refrigerating system. The shaft 31, drivingly connecting the spaced apart links 33, is provided with a gear 53 having a pinion and shaft connection, diagrammatically represented by the reference character 54, with a cam 56. Rotation of shaft 31 revolves pinion and shaft 54 and causes cam 56 to revolve and move a follower roller 57 engaging the same so as to operate a water valve, generally represented by the reference character 58, of a water supply means for the freezing device of the apparatus. Valve 58 has a conduit 59 connected thereto and leading to the freezing device of the apparatus for discharging water into the same. This water supply means is located exteriorly of the compartment 51 and forms no part of the present invention since it is the subject matter of my copending application entitled "Metering Device," Serial No. 407,202, filed February 1, 1954 and assigned to the assignee of this application. An electric motor 73, employed to rotate the short drive shaft 42, is wired through a combination selector and electrically operated timer or chronometric means 74 of any suitable or conventional construction. This combination device 74 is preferably provided with two push buttons 76 and 77 and may be so constructed as to normally be under the control of button 76 to cause the apparatus to function to produce continuous cycles of operation for freezing water in the freezing device portion thereof into ice blocks and to release the ice blocks therefrom. The combination device 74 is preferably constructed and arranged so that pushing of button 77 will render the part or parts thereof controlled by button 76 ineffective and cause the apparatus to produce a single ice block freezing and releasing cycle. The apparatus will remain under the control of button 77 to produce single cycles of operation, upon successively pushing the same, until the button 76 is again pushed. Combination device 74 is adjusted or pretimed to start and stop operation of electric motor 73 in accordance with the lapse of time required to freeze water in the freezing device into ice. Any suitable or conventional means can be provided to render the combination selector and timer device 74 of the apparatus ineffective to stop the release of ice blocks from the freezing device thereof. The provision of such means will prevent the accumulation of an excessive number of ice blocks in the compartment of the refrigerator cabinet when the demand for ice blocks is not present. An ice cube or block receptacle or container 79 is supported on the bottom wall of the freezing or frozen food compartment 51 of the refrigerator cabinet for receiving and storing ice blocks released from the freezing device of the apparatus. In order to harvest ice blocks from the refrigerator the door to compartment 51 may be opened and iceblocks removed from the receptacle 79.

Assuming that a predetermined amount of water has flown into the tray 28 of the freezing device of the apparatus disclosed in Figure 16 from the water supply valve 58 and that the apparatus is placed under control of the single cycle button 77, by pushing the same, with the refrigerating system associated with the refrigerator cabinet operating to produce a below freezing temperature of the evaporating plate 52. The combination selector and timer device 74 is therefore energized and after a predetermined interval of time of operation, to insure the freezing of water in the freezing device into ice blocks, this time device will connect the electric motor 73 with the source of electric current supply to cause its operation. Operation of motor 73 rotates the drive shaft 42, link 41, stud 34, links 33 and 36 at the motor end of the apparatus and consequently shaft 31 and the link 33, stud 34 and link 36 at the opposite end of the apparatus. Rotation of shaft 31 rotates the gear 53 thereon to rotate the pinion shaft 54 and cam 56. As the links 36 rotate about the axis of studs 34 downwardly relative to the axis of shafts 31 and 42 they force tray member 28 of the freezing device of the apparatus to swing about its pivotal mounting on rod 18 away from the grid member 22 and ice blocks bonded or adhering thereto (see Figure 7). Thereafter the ends of links 33 engage the end pieces 24 on grid member 22 to swing the grid about its pivotal mounting on rod 18 away from the stationary refrigerator evaporator plate 52 and causes the inclined flange 26 at the ends of grid member 22 to frictionally slide downwardly over the side wall surface of the stationary metal pieces 16. As the inclined surface of flange 26 on pieces 24 slide over pieces or cam means 16 the grid member 22 of the freezing device is stretched and extended longitudinally of its length to flex its resilient metal zigzag walls while the tray member 28 is being swung from beneath it in advance of the grid member by the links 36. Flexing of walls of the grid member 22 breaks the ice blocks loose therefrom and these substantially dry released ice blocks clear the tray member 28 as they fall into the container or receptacle 79. If the apparatus disclosed in Figures 9 to 15 of the drawings is incorporated in the system shown in Figure 16 the grid member 22 will also be twisted from end to end thereof to insure a more positive breaking of the bond between its resilient walls and ice blocks adhering thereto for releasing the blocks whereupon they fall into the container 79. Continued rotation of shaft 42 and other rotating parts connected thereto reverses the swinging motion of tray member 28 and this member then picks up and carries the grid member 22 back into its normal position in a substantially horizontal plane with the grid disposed in the tray and contacting the stationary evaporator 52. The rotating cam 56 comes into play, just prior to a complete rotation of the shafts 31 and 42 into a position to hold the freezing device of the apparatus in its normal location, and therefore actuates the lever 61 to open valve 58. Water will now flow from valve 58 through conduit 59 into the freezing device wherein it will be subsequently frozen into ice blocks. As the lobe of cam 56 moves past roller 57 operation of the apparatus is stopped by timer 74 and the shafts 42 and 31 together with the links form the means for normally holding the freezing device in a substantially horizontal plane. Also when the lobe on cam 56 passes roller 57 lever 61 is moved to cause the valve 58 to close and stop the flow of water into the freezing device. Additional individual single cycles of operation of the ice making apparatus will take place when button 77 of timer device 74 is again pushed or continuous automatic cycles will occur if the button 76 is pushed. It is desired to again point out that either of the freezing devices herein disclosed can be incorporated in a system of control as diagrammatically illustrated in Figure 16 of the drawings to flex the grid walls and stretch the grid lengthwise and/or twist the grid after its walls have been flexed and the grid extended.

From the foregoing it should be apparent that the present invention provides improved ice block making apparatus for a refrigerator of the household type. By flexing the resilient walls of a grid member of a freezing device as herein disclosed ice blocks can be released therefrom in dry form to thus eliminate sticking or bonding of the blocks together at the point they are collected for harvesting from the apparatus. By this invention the application of heat in any form to an ice block freezing device of an ice making apparatus is dispensed with. In apparatus of the type herein disclosed ice blocks may be produced in small quantities or the apparatus can be quickly converted to successively and continuously produce a large quantity of ice blocks automatically when the demand for such blocks exists. Apparatus of this invention can be actuated with a minimum of force to thereby utilize a small electric motor for operating the same.

While the forms of embodiment of the invention as herein disclosed constitute preferred forms, it is to be understood that other forms might be adopted as may come within the scope of the claims which follow.

What is claimed is as follows:

1. In an ice making apparatus, the combination of a stationary refrigerant evaporator, an elongated freezing device adapted to contain water to be frozen including a tray member and a grid member having walls disposed in said tray member for dividing the interior thereof into a plurailty of ice block forming compartments, a support for said device, means associated with said support for normally retaining said device in a substantially horizontal plane with a portion thereof contacting said evaporator during freezing of water in the device into separated ice blocks in said compartments, said device being pivotally mounted on said support, means for rotating said device together with separated ice blocks therein about its pivotal mounting relative to said support and said stationary evaporator, and means rendered effective by rotation of said device for stopping the rotation of one end of one of said members thereof while continuing to rotate its other end whereby said one member is twisted longitudinally thereof from end to end to flex its walls and release ice blocks from the device.

2. In an ice making apparatus, the combination of a stationary refrigerant evaporator, an elongated freezing device adapted to contain water to be frozen including a tray member and a grid member having resilient metal walls disposed in said tray member for dividing the interior thereof into a plurality of ice block forming compartments, a support for said device, means associated with said support for normally retaining said device in a substantially horizontal plane with a portion thereof contacting said evaporator during freezing of water in the device into separated ice blocks in said compartments, said device being pivotally mounted on said support, means for rotating said freezing device together with said grid member and separated ice blocks therein about its pivotal mounting relative to said stationary evaporator and to said support, means for breaking a bond between the tray member and ice blocks therein and for separating the tray member from ice blocks which adhere to said grid member upon rotating said device, and means for thereafter flexing the resilient walls of said grid member by stretching same lengthwise thereof for enlarging said compartments and releasing without the aid of additional means ice blocks therefrom.

3. In an ice making apparatus, the combination of a stationary refrigerant evaporator, an elongated freezing device adapted to contain water to be frozen including a tray member and a grid member having resilient metal walls disposed in said tray member for dividing the interior thereof into a plurality of ice block forming compartments, a support for said device, means associated with said support for normally retaining said device in a substantially horizontal plane with a portion thereof contacting said evaporator during freezing of water in the device into separated ice blocks in said compartments, said device being pivotally mounted on said support, means for rotating said freezing device together with said grid member and separated ice blocks therein about its pivotal mounting relative to said stationary evaporator and to said support, means for breaking a bond between the tray member and ice blocks therein and for separating the tray member from ice blocks which adhere to said grid member upon rotating said device, and means for thereafter twisting said grid member from end to end thereof and flexing its resilient metal walls for releasing ice blocks therefrom.

4. In an ice making apparatus, the combination of a stationary refrigerant evaporator, an elongated freezing device adapted to contain water to be frozen including a tray member and a grid member having resilient metal walls disposed in said tray member for dividing the interior thereof into a plurality of ice block forming compartments, a support for said device, means associated with said support for normally retaining said device in a substantially horizontal plane with a portion thereof contacting said evaporator during freezing of water in the device into separated ice blocks in said compartments, said device being pivotally mounted on said support, means for rotating said freezing device together with said grid member and separated ice blocks therein about its pivotal mounting relative to said stationary evaporator and to said support, means for breaking a bond between the tray member and ice blocks therein and for separating the tray member from ice blocks which adhere to said grid member upon rotating said device, and means for thereafter flexing the resilient metal walls of said grid member by stretching same lengthwise and twisting the walls from end to end of the grid member to release ice blocks therefrom.

5. In a method of releasing ice blocks from a freezing device including a resilient metal pan having a flexible walled grid therein dividing the pan into ice block forming compartments and wherein the pan and grid are pivotally mounted for swinging movement relative to a stationary refrigerated member which a portion of the device contacts during freezing of water therein into separated ice blocks within said compartments, the steps comprising; simultaneously rotating the pan and grid of the device about their pivotal mounting away from the stationary refrigerated member, distorting the resilient pan during initial stages of rotation of the device to free the pan from ice blocks adhering to the grid, stopping the rotary movement of the grid and ice blocks while continuing to rotate the pan with respect thereto, and finally flexing the walls of the grid to release ice blocks therefrom.

6. In a method of releasing ice blocks from a freezing device including a resilient metal pan having a flexible walled grid therein dividing the pan into ice block forming compartments and wherein the pan and grid are pivotally mounted for swinging movement relative to a stationary refrigerated member which a portion of the device contacts during freezing of water therein into separated ice blocks within said compartments, the steps comprising; simultaneously rotating the pan and grid of the device about their pivotal mounting away from the stationary refrigerated member, distorting the resilient pan during initial stages of rotation of the device to free the pan from ice blocks adhering to the grid, stopping the rotary movement of the grid and ice blocks while continuing to rotate the pan with respect thereto, and finally stretching the grid to extend its flexible walls longitudinally and enlarge said compartments for releasing ice blocks therefrom.

7. In a method of releasing ice blocks from a freezing device including a resilient metal pan having a flexible walled grid therein dividing the pan into ice block forming compartments and wherein the pan and grid are pivotally mounted for swinging movement relative to a stationary refrigerated member which a portion of the device contacts during freezing of water therein into separated ice blocks within said compartments, the steps comprising; simultaneously rotating the pan and grid of the device about their pivotal mounting away from the stationary refrigerated member, distorting the resilient pan during initial stages of rotation of the device to free the pan from ice blocks adhering to the grid, stopping the rotary movement of the grid and ice blocks while continuing to rotate the pan with respect thereto, and finally stretching the grid to extend its flexible walls longitudinally and twisting same from end to end of the grid for releasing ice blocks therefrom.

8. In an ice making apparatus, the combination of an elongated freezing device adapted to contain water to be frozen including a tray member and a grid member disposed therein dividing the interior thereof into a plurality of ice block forming compartments, a stationary support for said device, means associated with said support normally retaining said device in a horizontal plane during freezing of water therein into separated ice blocks in said compartments thereof, said device being pivotally mounted on said support, means for simultaneously rotating said tray member and said grid member together with ice blocks in said device about said pivotal mounting relative to said support, means associated with said stationary support engageable by one of said members upon rotation of said device, and engagement of said one member with said last named means causing said rotating means to move an end of said one member relative to the other end thereof in the direction of rotation of said device to twist said one member throughout its length for releasing the separated ice blocks therefrom.

9. In an ice making apparatus, the combination of a stationary refrigerant evaporator, an elongated freezing device adapted to contain water to be frozen including a tray member and a grid member disposed therein dividing the interior thereof into a plurality of ice block forming compartments, a support for said device, means for normally retaining said device in a substantially horizontal plane with a portion thereof contacting said evaporator during freezing of water in the device into separated ice blocks in said compartment, said device being pivotally mounted on said support, means for rotating said tray member and said grid member together with ice blocks in said device about said pivotal mounting relative to said stationary evaporator, and means for thereafter causing relative movement between the ends of one of said members in the direction of rotation of said device to twist said one member throughout the length thereof for releasing the separated ice blocks therefrom.

References Cited in the file of this patent

UNITED STATES PATENTS

| 2,028,047 | Cole | Jan. 14, 1936 |
| 2,161,321 | Smith | June 6, 1939 |
| 2,265,349 | Cole | Dec. 9, 1941 |
| 2,364,559 | Storer | Dec. 5, 1944 |
| 2,701,453 | Henderson | Feb. 8, 1955 |